United States Patent
Meisinger, Sr. et al.

(10) Patent No.: US 11,728,638 B2
(45) Date of Patent: Aug. 15, 2023

(54) NORMALLY OPEN TIE PULSE TESTING

(71) Applicant: S&C Electric Company, Chicago, IL (US)

(72) Inventors: Michael John Meisinger, Sr., Chicago, IL (US); David Klein, Glenview, IL (US)

(73) Assignee: S&C Electric Company, Chicago, IL (US)

( * ) Notice: Subject to any disclaimer, the term of this patent is extended or adjusted under 35 U.S.C. 154(b) by 148 days.

(21) Appl. No.: 17/489,947

(22) Filed: Sep. 30, 2021

(65) Prior Publication Data

US 2022/0109293 A1 Apr. 7, 2022

Related U.S. Application Data (60) Provisional application No. 63/086,215, filed on Oct. 1, 2020.

(51) Int. Cl.
*H02H 3/06* (2006.01)
*H02H 3/08* (2006.01)

(52) U.S. Cl.
CPC .............. *H02H 3/06* (2013.01); *H02H 3/083* (2013.01)

(58) Field of Classification Search
CPC ............ H02H 3/00; H02H 3/02; H02H 3/021; H02H 3/023; H02H 3/027; H02H 3/033; H02H 3/042; H02H 3/044; H02H 3/05; H02H 3/06; H02H 3/063; H02H 3/066; H02H 3/07; H02H 3/08; H02H 3/081; H02H 3/083; H02H 3/093; H02H 3/10; H02H 3/105; H02H 3/16; H02H 3/162; H02H 3/165; H02H 7/22; H02H 7/222; H02H 7/26–30; G01R 31/00; G01R 31/08; G01R 31/085; G01R 31/086; (Continued)

(56) References Cited

U.S. PATENT DOCUMENTS

| | | | |
|---|---|---|---|
| 2008/0266733 A1* | 10/2008 | O'Leary | H01H 75/04 361/71 |
| 2019/0280476 A1* | 9/2019 | Fan | G01R 31/08 |

OTHER PUBLICATIONS

Y. Lee, "New Feeder Automation Scheme using VIT Reclosers and VIT Sectionalizers", IEEE, 2013. (Year: 2013).*

* cited by examiner

*Primary Examiner* — Thienvu V Tran
*Assistant Examiner* — Carlos O Rivera-Perez (57) ABSTRACT

A control system and method for tie point fault interrupter and sectionalizing recloser devices in an electrical grid feeder. The technique enables automated sectionalizing reclosers equipped with three-phase current sensing and single- or three-phase voltage sensing, and able to detect pulse-closing operations, to isolate faults and restore load based on pulse count rather than requiring source re-energization and waiting for loss of voltage timers. The system includes a fault interrupter initiating a pulse-testing sequence upon detecting loss of voltage, where a number of preliminary pulses are used to distinguish transient faults from persistent faults, and pulses are counted by the sectionalizing reclosers to determine which of these devices should open. An alternate configuration is disclosed for reinitializing faults, including the fault interrupter closing if initial pulse testing indicates no fault, and subsequent cycles cause a sectionalizing recloser adjacent the fault to open, allowing the fault interrupter to close and hold.

20 Claims, 6 Drawing Sheets

(58) Field of Classification Search
CPC ...... G01R 31/088; G01R 31/10; G01R 31/11; G01R 31/3336
USPC ..... 361/62–66, 71–76, 115, 160, 166, 168.1, 361/187
See application file for complete search history.

NORMALLY OPEN TIE PULSE TESTING

CROSS-REFERENCE TO RELATED APPLICATION

This application claims the benefit of priority from the U.S. Provisional Application No. 63/086,215, filed on Oct. 1, 2020, the disclosure of which is hereby expressly incorporated herein by reference for all purposes.

BACKGROUND

Field

The present disclosure relates generally to a control scheme for fault interrupting tie point and recloser devices in an electrical grid feeder. More particularly, it relates to a system and method enabling automated sectionalizing reclosers to isolate faults and restore load based on pulse-test counts.

Discussion of the Related Art

An electrical power transmission/distribution network, often referred to as an electrical grid, typically includes a number of power generation plants each including a number of power generator units, such as gas turbine engines, nuclear reactors, coal-fired generators, hydro-electric dams, etc. The grid may also include wind and/or solar energy generation farms. Not only are there many different types of energy generators on the grid, but there are also many different types of loads, and the generators and loads are distributed over large geographic areas. The transmission grid carries electricity from the power plants over long distances at high voltages. The distribution grid, separated from the transmission grid by voltage-reducing substations, provides electricity to the consumers/loads.

Many portions of the distribution grid, commonly known as feeders, are arranged between two or more different sources (i.e., substations), where one source is a main or primary source which is normally connected to and powers the feeder, and the other sources are alternates which are normally disconnected from the feeder by a tie switch. Additional switches, known as sectionalizing switches, are also typically placed along the length of a feeder, thereby creating multiple feeder sections each separated by a switch, where each feeder section typically serves multiple customers. If a fault occurs in the feeder, the fault can be isolated by opening one or more of the normally-closed sectionalizing switches.

Control of the sectionalizing switches has been largely automated in recent years, using a strategy known as fault location, isolation and service restoration (FLISR). FLISR applications can reduce the number of customers impacted by a fault by automatically isolating the trouble area and restoring service to remaining customers by transferring them to adjacent circuits. In addition, the fault isolation feature of the technology can help crews locate the trouble spots more quickly, resulting in shorter outage durations for the customers impacted by the faulted section.

One known FLISR technique is centralized FLISR, where real-time communications between switches and a controller are required in order to locate and isolate a fault in a feeder. This type of centralized FLISR is effective when the real-time communication channels are operable, but is completely defeated when communication is interrupted for any reason. The communication system also adds cost and complexity to the switches. Another known FLISR technique involves pre-defined, static behavior characteristics for each sectionalizing switch. In this approach, each switch is pre-programmed to open if it experiences a certain number of fault current or voltage events, where the pre-programmed number is based on each switch's proximity to the feeder source. However, the determination of fault persistence in prior art techniques requires reenergizing the feeder to the primary source which repeatedly creates large fault currents, and also requires several timers to expire in a sequence which delays the recovery of unfaulted customer load.

Tie-point fault interrupting devices configured to perform a pulse-testing technique are also known in the industry. These devices operate as a smart tie switch and fault interrupter which, after a fault is initially detected and the breaker or switch between the primary source and the fault opens, deliver a series of test pulses to the feeder. The test pulses are low power pulses designed to detect the continued presence of a fault, where the pulse-testing tie-point fault interrupting devices only close to establish a feeder connection to an alternate source if the fault is first isolated by opening of a sectionalizing switch. However, in prior art techniques, the use of pulse-testing techniques in the tie-point fault interrupting devices is delayed by the reclosing attempts and eventual loss of voltage time delays of the sectionalizing switches.

In view of the circumstances described above, there is a need for a device control methodology which does not rely on real-time communications between reclosers and fault interrupters in distribution grid feeders, yet controls recloser and fault interrupter behavior properly in order to isolate faults quickly while still accruing the benefits of using low-power test pulses.

SUMMARY

The present disclosure describes a control system and method for tie point fault interrupter and sectionalizing recloser devices in an electrical grid feeder. The technique enables automated sectionalizing reclosers equipped with three-phase current and single- or three-phase voltage sensing, and able to detect pulse-closing operations, to isolate faults and restore load based on pulse count rather than requiring primary source re-energization and waiting for loss of voltage timers. The system also includes a tie-point fault interrupting device initiating a pulse-testing sequence upon detecting loss of voltage, where a predetermined number of preliminary pulses are used to distinguish between transient faults and persistent faults, and pulses are counted by the sectionalizing reclosers in order to determine which of these devices should open. An alternate configuration is disclosed where reinitializing faults are anticipated, where the alternate configuration includes the tie point fault interrupter closing if initial pulse testing indicates no fault, and subsequent cycles cause a sectionalizing recloser adjacent the fault to open, allowing the tie point fault interrupter to close and hold.

Additional features of the present disclosure will become apparent from the following description and appended claims, taken in conjunction with the accompanying drawings.

DETAILED DESCRIPTION OF THE EMBODIMENTS

The following discussion of the embodiments of the disclosure directed to a technique for isolating a fault in a feeder using sectionalizing reclosers, including using pulse-testing counts to avoid full-current reclosing for determining fault persistence, is merely exemplary in nature, and is in no way intended to limit the disclosure or its applications or uses.

An electrical power grid consists of a transmission network and a distribution network. The transmission network handles the movement of high-voltage electrical energy from a generating site, such as a power plant, to an electrical substation. The distribution network moves medium-voltage electrical energy on local wiring between substations and customers. Because the distribution portion of the grid includes power lines which are susceptible to problems such as downed power poles and downed tree limbs, faults are relatively common on the distribution grid. Fault location, isolation and service restoration (FLISR) is the name given to a set of techniques used to recover from faults on the distribution grid.

Figure 1:
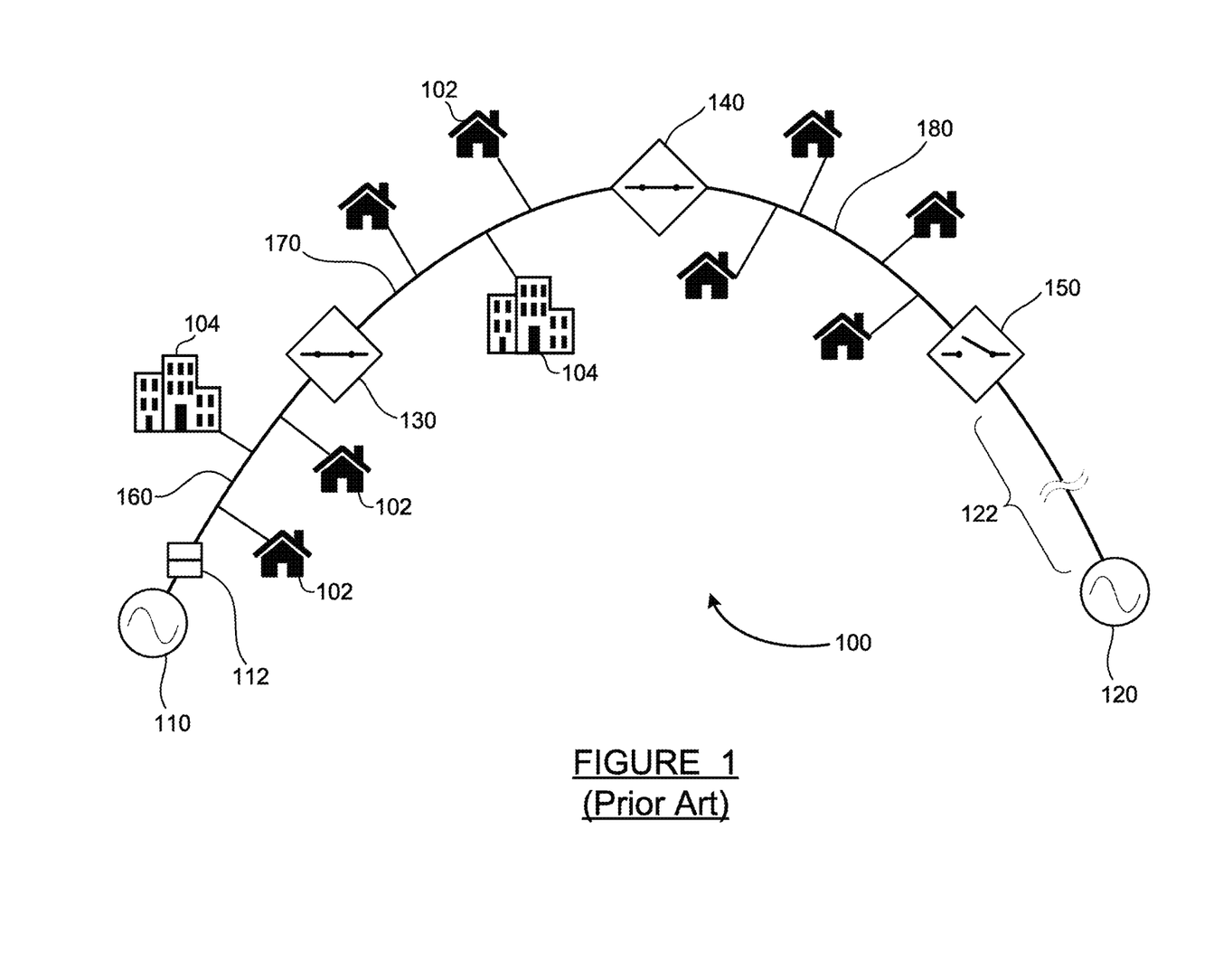
FIG. 1 is a schematic diagram of a typical simple feeder, or portion of the distribution grid, as known in the art.

FIG. 1 is a schematic diagram of a typical feeder 100, or portion of the distribution grid, as known in the art. The feeder 100 provides electrical energy to many end customers, including houses 102 and businesses 104. The feeder 100 has a main power source 110 at one end and an alternate source 120 at the other end. The sources 110 and 120 are typically substations, where high voltage energy (often several hundred thousand volts) on the transmission grid is transformed down to medium voltage energy (less than 30,000 volts). The main source 110 is normally connected to and provides the power to the feeder 100, with a breaker 112 positioned proximal the main source 110, where the breaker 112 trips open if necessary to disconnect the main source 110 from the feeder 100. The alternative source 120 is normally disconnected from the feeder 100 by a tie switch 150. The tie switch 150 is typically located at a boundary with another feeder; that is, there is another feeder (other customers, separated by switches) in the area designated at 122.

Between the main source 110 and the tie switch 150, switches 130 and 140 divide the feeder 100 into sections. A section 160 is located between the main source 110 and the switch 130, a section 170 is located between the switch 130 and the switch 140, and a section 180 is located between the switch 140 and the tie switch 150. The switches 130 and 140 are normally closed, so that the main source 110 provides power to the sections 160, 170 and 180 of the feeder 100. The tie switch 150 is normally open, so that the alternative source 120 is normally not connected to the feeder 100. The switches 130 and 140, which separate the sections 160, 170 and 180, are known as sectionalizing switches.

It is to be understood that the feeder 100 is a three-phase network. That is, each of the sections 160, 170 and 180 includes three lines ($L_1$, $L_2$, $L_3$), each 120° out of phase with the others. The houses 102 and the businesses 104 may receive service from one or more of the phases, where the houses 102 almost always have single-phase service, and the businesses 104 may have three-phase service if they have high energy demands and/or large inductive loads such as motors. The feeder 100 illustrated in FIG. 1 is very simple, not including branches as would be found in most real-world feeders. The feeder 100 is merely shown and discussed here as a way of introducing general feeder topology and terminology, and describing the basic function of sectionalizing switches.

If a fault occurs in the feeder 100, such as for example a lightning strike which damages or knocks down one or more power lines in the section 180 causing a line-to-line or line-to-ground fault, it is possible to isolate the fault and restore power to the sections 160 and 170 by opening the switch 140. This fault isolation and service restoration could be performed by line service crews visually locating the fault and manually opening the switch. A much better alternative is the use of FLISR techniques, where fault isolation and service restoration happens automatically and very fast.

However, traditional centralized FLISR techniques require real-time communication between the switches 130/140/150 and a common controller, so that voltage and current measurements at each device, along with device open/closed status, can be used to command and control the status of other adjacent devices. These real-time communication-based FLISR techniques work well as long as the communication channels are operable, but are completely defeated if the communication channels are inoperable. Even with modern technology, any communication medium can experience an outage—whether due to equipment failure, infrastructure damage, wireless signal interference or jamming, computer malware, or otherwise. In addition, the requirement for communications capability in the sectionalizing switches increases the cost and complexity of the switches. For these reasons, there is an increasing demand for FLISR techniques which do not rely on real-time communication.

Figure 2:
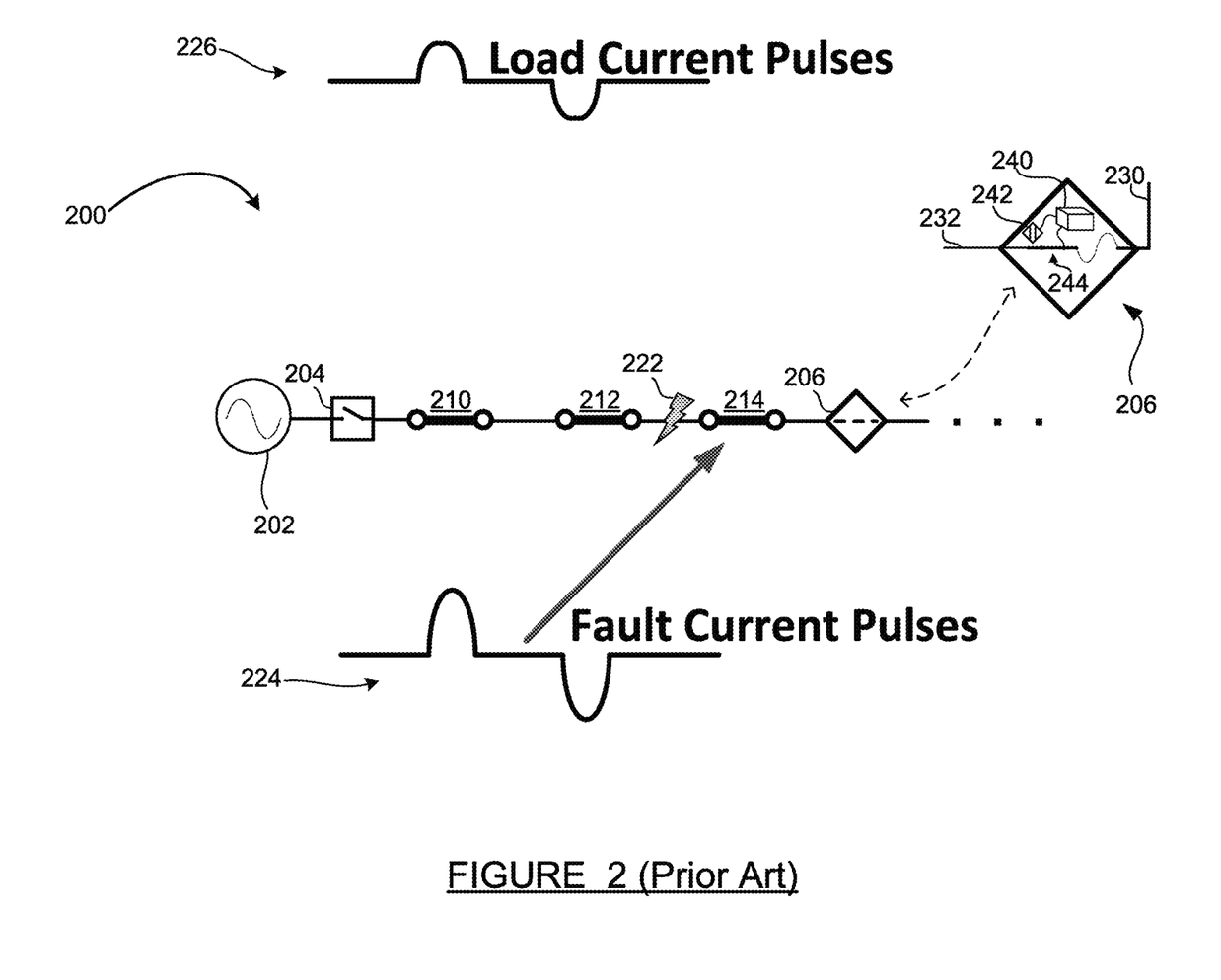
FIG. 2 is a schematic diagram of a feeder illustrating known techniques for fault detection using test pulses from a tie point fault interrupter.

FIG. 2 is a schematic diagram of a feeder 200 illustrating known techniques for fault detection using test pulses from a tie point fault interrupter. The feeder 200 includes a source 202 and an adjacent circuit breaker 204. The feeder 200 also includes a plurality of sectionalizing switches, as discussed above. Loads (homes and businesses) are not shown in FIG. 2 for the sake of simplicity and clarity.

A tie point fault interrupter 206 separates the feeder 200 from an adjacent feeder to the right. The tie point fault interrupter 206 is normally open, and includes pulse-testing capability as discussed below. A block diagram of the main elements of the tie point fault interrupter 206 is shown at the right of FIG. 2. The tie point fault interrupter 206 receives high-voltage power from the transmission grid on line 230 and, through the use of transformers, provides medium-voltage power to the feeder 200 on line 232. Again, both the lines 230 and 232 are three phases, represented here by a single line for simplicity. A controller 240 is in communication with a plurality of sensors 242 and switches 244. The controller 240 includes a processor and memory capable of storing data and programming instructions for controlling the operation of the tie point fault interrupter 206. The sensors 242 include at least a current sensor and a voltage sensor on each of the three phases, where the sensors 242 are capable of detecting conditions such as low voltage or excess current which indicate a fault somewhere in the feeder 200 on one or more of the phases.

Based on data from the sensors 242, the controller 240 may determine that it is necessary to open or close the switches 244, or initiate a pulse-testing sequence. For example, upon detecting a loss of voltage from the feeder 200 (indicating that a switch has opened in the feeder 200 to isolate a fault), the tie point fault interrupter will perform a pulse-testing sequence in an attempt to fully isolate the fault and subsequently restore power to a portion of the feeder 200. This sectionalizing switch and pulse-closing device operation is discussed further below.

The feeder 200 also includes sectionalizing switches 210, 212 and 214. The sectionalizing switches 210-214 are all normally-closed, providing connectivity from the source 202 to the entire feeder 200. In the known distributed FLISR technique of FIG. 2, the sectionalizing switches do not have communication capability; rather, each of the sectionalizing switches 210-214 includes current sensors, optionally voltage sensors, and a controller capable of opening the switch under certain conditions in order to isolate a fault.

The controller in each of the sectionalizing switches 210-214 is configured with pre-defined logic which determines under what conditions the particular switch will open. The pre-defined logic, designed to isolate a fault in the feeder 200 without opening more switches than necessary to isolate the fault, is based on each switch's proximity to the active feeder source. In particular, switches further from the source 202 have faster response times when experiencing a fault current. The sectionalizing switches 210-214 are also configured to detect fault-pulse events and load-pulse events during the pulse-test sequence of the tie point fault interrupter 206.

The sectionalizing switches 210-214 each have a threshold value for FC (Fault pulse Counts), where the FC threshold represents the number of fault current pulse events that a switch must count during a tie point fault interrupter pulse testing sequence in order for the switch to trigger itself to open. Fault currents are relatively high currents because the current is flowing from the source (through the tie point fault interrupter 206 in this case) to a fault such as a short to ground, while load currents are relatively lower currents flowing from the source to whatever loads are online downstream of a switch.

The pre-defined values of FC threshold are designed to cause the desired switch opening behavior in the event of a fault, as long as each switch can distinguish between fault current pulses and load current pulses. For example, in the event of a fault 222 in the feeder 200 between the sectionalizing switches 212 and 214, the desired response is for the switches 212 and 214 to open, thereby fully isolating the fault. After the fault 222 is initially detected (with the source 202 active), the switch 212 will open based on its fault current response time. Then, when the tie point fault interrupter 206 detects a loss of voltage, the tie point fault interrupter 206 will begin its pulse testing sequence, where it develops a sequence of current pulses through the feeder 200. The pulses provided by the tie point fault interrupter 206 are not full-power reclosing events, as it is undesirable to repeatedly expose portions of the feeder 200 to huge fault currents.

The tie point fault interrupter 206 uses low energy pulse testing to determine if a fault is still present on feeder 200 prior to closing. The pulse testing is performed using logic built into the controller 240 in the fault interrupter 206 to adequately test for faults while avoiding the repetitive high current stress of conventional reclosing when the fault 222 is present on feeder 200. The fault interrupter 206 generates a pulse by closing its switch contacts for a very brief time so that the current pulse is typically less than one half-cycle of the fundamental frequency for a load connected to the circuit. A pulse that results when the fault 222 is present may be greater in magnitude than a load pulse (as shown in FIG. 2), and may also be longer in duration than a load pulse. In one embodiment, the fault interrupter 206 may generate additional pulses of either polarity to confirm the presence of the fault 222, for example, the fault pulses shown in FIG. 2. In some instances, pulse testing is carried out on only a single phase. In other instances, such as when the fault interrupter 206 has no initial awareness of which phase is faulted, pulse testing may be performed on all three phases.

Ideally, the sectionalizing switches 210-214 can discriminate between fault current pulses 224 (larger current pulses indicating that a switch is located between the active tie point fault interrupter and the fault) and load current pulses 226. If this discrimination isn't possible, the sectionalizing switches 210-214 can alternatively distinguish between a current pulse that is (load current pulse) or isn't (fault current pulse) followed by some period (for example, 30-45 cycles) of momentary system voltage. This momentary application of system voltage following a normal load pulse (absence of fault) is a prescribed part of the pulse-testing sequence by the tie point fault interrupter 206. In FIG. 2, the switch 214 experiences the fault current pulses 224, while none of the switches experience the load current pulses 226. The switches 210 and 212 may not experience any current pulse at all because they are downstream of the fault 222; or, if the fault only affects one phase, the switches 210 and 212 may experience load current pulses on unfaulted phases.

The behavior of the tie point fault interrupter 206 during pulse testing, discussed above, is known in the art. However, in prior art systems, before the tie point fault interrupter 206 begins its pulse testing, the sectionalizing switches and/or the breaker 204 repeatedly re-energize faulted feeder sections to test for continued fault presence. It is only after the sectionalizing switches and/or the breaker 204 progress to lockout (several reclosings have been attempted, and the fault is still present, so no more reclosings will be attempted and the device which faulted open will remain open) that the tie point fault interrupter 206 can close or begin its pulse testing.

The present disclosure describes new control logic in both tie point fault interrupters and sectionalizing switches which reduces the number of full-current reclosing attempts needed by a source and breaker, and also reduces the time required to isolate a fault and restore load to unfaulted portions of a feeder. These techniques are discussed in relation to the following figures.

Figure 3:
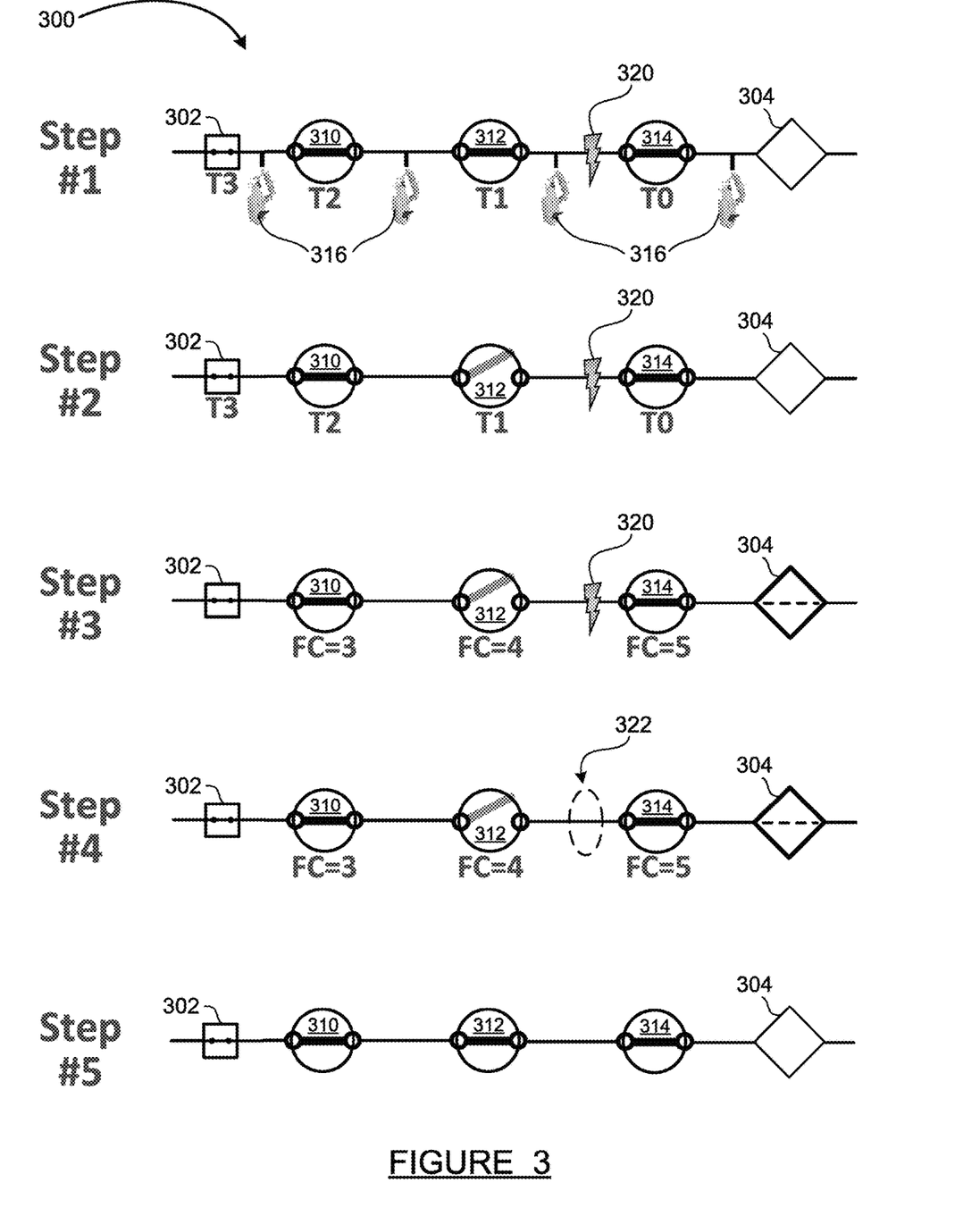
FIG. 3 is a multi-step schematic diagram of a feeder having a transient fault and illustrating sectionalizing reclosers and a tie point fault interrupter configured to improve fault recovery behavior compared to prior art systems by using pulse testing techniques, according to an embodiment of the present disclosure.

FIG. 3 is a multi-step schematic diagram of a feeder 300 having a transient fault and illustrating sectionalizing reclosers and a tie point fault interrupter configured to improve fault recovery behavior compared to prior art systems by using pulse testing techniques, according to an embodiment of the present disclosure.

The feeder 300 includes a circuit breaker 302 which provides over-current protection to the entire feeder 300, as discussed earlier. It is to be understood that a primary power source (i.e., a substation, not shown) is located immediately to the left of the breaker 302. A tie point fault interrupter 304 is located at the right end of the feeder 300. The tie point fault interrupter 304 serves as a boundary or "tie point" to an adjacent feeder, as discussed earlier. The tie point fault interrupter 304 is normally open, such that the feeder 300 receives its power from the primary source (to the left of the breaker 302), and is not electrically connected to the adjacent feeder to the right.

Sectionalizing reclosers 310, 312 and 314 are spaced apart along the length of the feeder 300. The sectionalizing reclosers 310/312/314 are similar to the sectionalizing switches discussed earlier, but have additional control logic to enhance the fault isolation behavior of the feeder 300, according to the present disclosure. The sectionalizing reclosers 310/312/314 are all normally closed, providing electrical continuity along the length of the feeder 300. The feeder 300, the breaker 302, the tie point fault interrupter 304 and the sectionalizing reclosers 310/312/314 are all three phase devices, as discussed earlier. As would be understood by one skilled in the art, single phase "laterals" may branch off of the feeder 300 at various points, where the laterals are typically dead end lines which provide power to a limited number of customers, such as a side street in a subdivision. Single phase fault interrupters 316 may be provided where the laterals connect to the feeder 300. These single phase fault interrupters 316 are merely mentioned here for completeness, do not affect the operation of the other devices in the disclosed method, and are therefore omitted from subsequent steps of FIG. 3 and later drawing figures.

The tie point fault interrupter 304 is a device capable of pulse testing, similar to the tie point fault interrupter 206 of FIG. 2, and similarly includes switches, sensors and a controller. The sectionalizing reclosers 310/312/314 also include switches, sensors and a controller. The tie point fault interrupter 304 and the sectionalizing reclosers 310/312/314 do not require communication capability (the ability to send status information and control commands from one device to another via electronic communications). Rather, these devices detect and diagnose the state of the feeder 300 based on signals from their own current and voltage sensors, using control logic discussed in detail below.

The scenario of FIG. 3 is that of a transient fault. Transient faults are common in distribution grid feeders and may be caused, for example, by a tree limb breaking and falling across power lines, which creates either a phase-to-phase or a phase-to-ground fault, followed by the tree limb falling away to the ground within a few seconds. Because transient faults are common, techniques have been developed in the prior art to test for fault persistence, and to reclose sectionalizing switches in the event that a fault clears itself within a few seconds.

The breaker 302 and sectionalizing reclosers 310/312/314 are each configured to trip open if necessary in the event of a fault in the feeder 300. In order to achieve the desired behavior, the breaker 302 and sectionalizing reclosers 310/312/314 are each configured with a fault current response time, where the breaker 302 has the longest response time, and the sectionalizing recloser furthest from the source (that is, the sectionalizing recloser 314) has the shortest response time. The response times are shown in Step 1 as T0-T3, where T3>T2>T1>T0. In other words, the sectionalizing recloser 314 might be configured to trip open if it senses a fault current for 0.5 seconds, with the sectionalizing recloser 312 having a fault current response time of 1.0 seconds, the sectionalizing recloser 310 having a response time of 1.5 seconds, and the breaker 302 having a response time of 2.0 seconds. These response time values are merely illustrative. The important point is that devices closest to the source have the longest response time, and vice versa.

At Step 1, a fault 320 occurs between the sectionalizing reclosers 312 and 314. When the fault 320 occurs, a fault current passes through the breaker 302 and the sectionalizing reclosers 310 and 312. The sectionalizing recloser 314 does not see a fault current, because it is not located between the source and the fault 320. Of the devices experiencing a fault current, the sectionalizing recloser 312 has the shortest response time (T1). Thus, after its fault current response time elapses, the sectionalizing recloser 312 opens, as shown at Step 2.

With the sectionalizing recloser 312 open as shown in Step 2, the fault 320 is isolated from the breaker 302, the breaker 302 can remain closed, and the customers on both sides of the sectionalizing recloser 310 have power. Also, because the sectionalizing recloser 312 is open, everything to the right of the sectionalizing recloser 312 sees a complete loss of voltage, typically on all three phases. In prior art systems, after the sectionalizing recloser 312 opens, it would perform several reclosing attempts in order to determine if the fault is persistent or if the fault is transient. These reclosing attempts completely re-energize the faulted segment temporarily, which is undesirable. In the techniques of the present disclosure, the sectionalizing recloser 312 does not reclose to determine fault persistence; it remains open.

At Step 3, because it has detected a loss of voltage, the tie point fault interrupter 304 initiates its pulse testing sequence. This is indicated at Step 3 of FIG. 3 by the heavy outline of the tie point fault interrupter 304 and the dashed horizontal line within. According to the presently disclosed methods, the pulse testing of the tie point fault interrupter 304 can advantageously be used both for determination of fault persistence and for full fault isolation.

In order to achieve the benefits of the pulse testing, a number of preliminary pulses is defined for the tie point fault interrupter 304. The number of preliminary pulses is defined as one less than the number of sectionalizing reclosers in series in the feeder 300. Thus, because the number of sectionalizing recloser is three, the number of preliminary pulses is defined as two for the feeder 300. The tie point fault interrupter 304 is then configured to deliver two preliminary test pulses, and if the two pulses are both determined to be fault pulses (as discussed relative to FIG. 2), then the fault is determined to be persistent. If the first or second test pulse reveals no fault current (only a load current), then it is known that the fault has cleared and no further testing is necessary.

The techniques of the present disclosure also include defining fault count (FC) threshold values for each of the sectionalizing reclosers in the feeder 300. These FC threshold values are shown at Step 3, and are lowest for the sectionalizing recloser which is furthest from the tie point fault interrupter 304, with the threshold increasing by one for each position nearer the tie point fault interrupter 304. Furthermore, the sectionalizing recloser which is furthest from the tie point fault interrupter 304 is defined to have an FC threshold one greater than the number of preliminary test pulses. Because the number of preliminary test pulses is two, the sectionalizing recloser 310 is defined as having a fault count threshold FC=3. The sectionalizing recloser 312 therefore has a threshold FC=4, and the sectionalizing recloser 314 therefore has a threshold FC=5, as shown at Step 3.

Consider that at Step 3, on the first test pulse by the tie point fault interrupter 304, a fault current is detected, indicating that the fault 320 is still present. Then, at Step 4, on the second test pulse, no fault current is detected (only a load current pulse), indicating that the fault 320 has self-cleared as indicated at reference 322. At this point, the tie point fault interrupter 304 knows that the fault has cleared, so the tie point fault interrupter 304 stops its pulse testing sequence, and also suspends (prevents) itself from closing.

The sectionalizing recloser 312 is also actively monitoring conditions throughout Step 3 and Step 4. The sectionalizing reclosers 310/312/314 have voltage sensors on both sides of their internal switches, so they can detect voltage conditions on both sides even when open. At Step 3, the sectionalizing recloser 312 would have detected an abnormal voltage pulse and a lack of subsequent momentary system voltage on its right side (from the tie point fault interrupter 304 and through the fault 320). For example, the voltage pulse at Step 3 might have been a normal voltage pulse followed by the subsequent momentary presence of system voltage on two phases, and an abnormally low voltage pulse and lack of subsequent momentary system voltage on the other phase. At Step 4, the sectionalizing recloser 312 would experience a normal, healthy voltage pulse followed by the momentary presence of system voltage on its right side because the fault 320 has cleared. The sectionalizing recloser 312 may detect the momentary presence of system voltage on all three phases if three phase voltage sensing is available, or only on a single phase. The momentary (30-45 cycles) return of system voltage indicates that the tie point fault interrupter 304 has completed a pulse-testing sequence and found no fault. This is in contrast to the momentary (10-15 cycles) return of system voltage that can occur when an unfaulted phase is pulse-tested before a faulted phase. Based on the detection of a healthy voltage pulse followed by the momentary presence of system voltage on the side of the earlier fault, the sectionalizing recloser 312 knows that it can reclose.

At Step 5, the tie point fault interrupter 304 has returned to its normal open condition, and the sectionalizing recloser 312 has reclosed based on the analysis described above. Thus, after the transient fault self-cleared, the feeder 300 has returned to its normal pre-fault condition, and all customers are receiving power. The restoration of normal feeder conditions shown in FIG. 3 was accomplished without the sectionalizing recloser 312 repeatedly reclosing onto the fault, as would have been done in prior art techniques. At Step 5, fault current timers and fault counters are all reset to zero, and any new fault occurring in the future can be handled in the same manner as described above. FIG. 3 and the discussion above illustrate how the methodology of the present disclosure works in the case of a transient fault. In the following discussion, it will be explained how the methodology also works properly in the case of a persistent fault.

Figure 4:
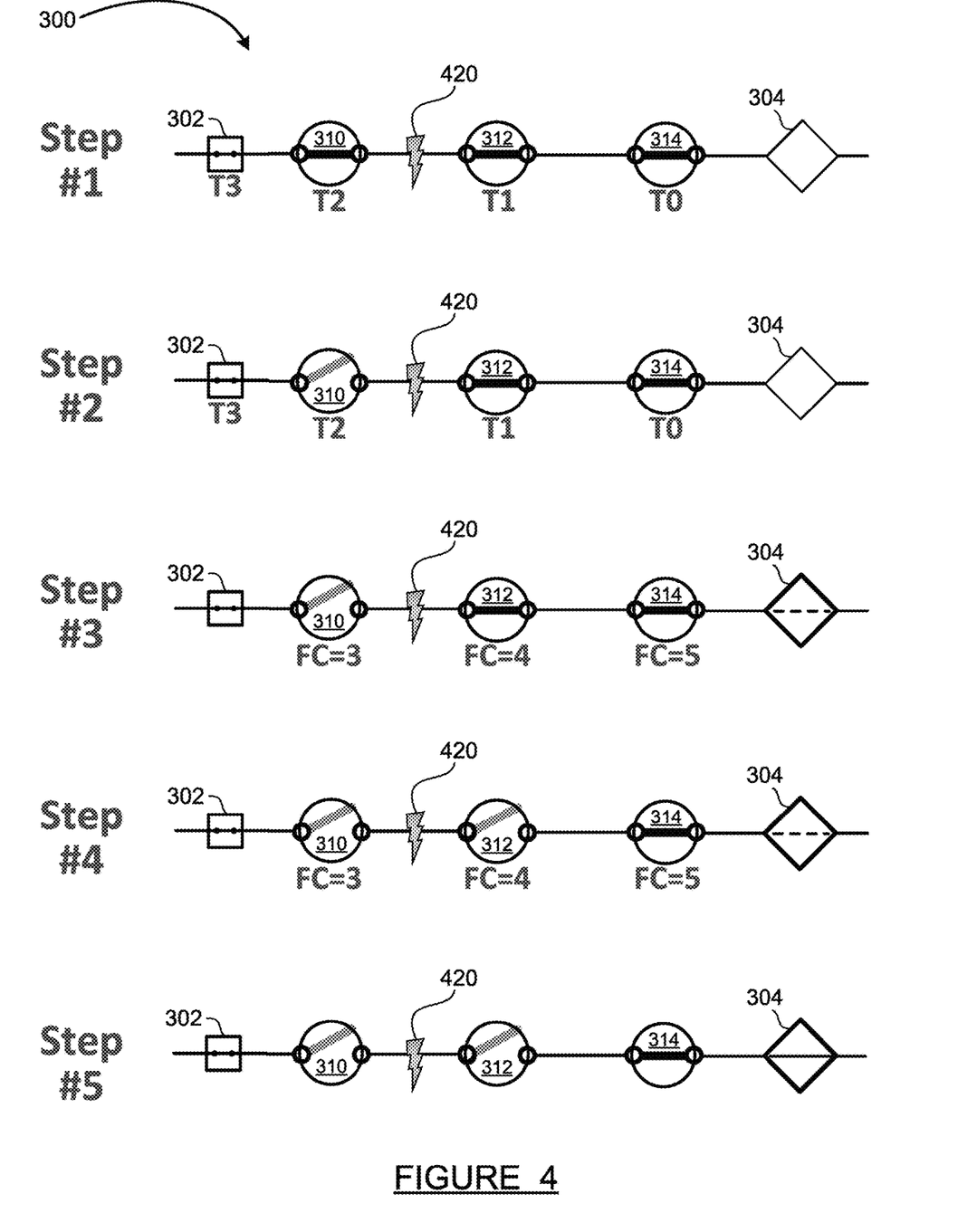
FIG. 4 is a multi-step schematic diagram of the feeder of FIG. 3 having a persistent fault and illustrating improved fault recovery behavior compared to prior art systems by using pulse testing techniques, according to an embodiment of the present disclosure.

FIG. 4 is a multi-step schematic diagram of the feeder 300 having a persistent fault and illustrating improved fault recovery behavior compared to prior art systems by using pulse testing techniques, according to an embodiment of the present disclosure. The feeder 300 in FIG. 4 is unchanged from that of FIG. 3; the hardware, configurations and control logic are all the same; only the location and persistence of the fault has changed in FIG. 4, thus illustrating a different scenario. The single phase fault interrupters 316 are omitted from FIG. 4 for simplicity.

At Step 1 of FIG. 4, a fault 420 occurs between the sectionalizing reclosers 310 and 312. The location of the fault 420 is changed from the location of the fault 320 (of FIG. 3) simply for the sake of variety. When the fault 420 occurs, a fault current passes through the breaker 302 and the sectionalizing recloser 310. The sectionalizing reclosers 312 and 314 do not see a fault current, because they are not located between the source and the fault 420. Of the devices experiencing a fault current, the sectionalizing recloser 310 has the shorter fault current response time (T2). Thus, after its response time elapses, the sectionalizing recloser 310 opens, as shown at Step 2.

With the sectionalizing recloser 310 open as shown in Step 2, the fault 420 is isolated from the breaker 302, the breaker 302 can remain closed, and the customers on the left side of the sectionalizing recloser 310 have power. Also, because the sectionalizing recloser 310 is open, everything to the right of the sectionalizing recloser 310 sees a complete loss of voltage, typically on all three phases. Once again, the reclosing attempts of the sectionalizing recloser 310, as would be done in prior art systems, are avoided in the methodology of the present disclosure.

At Step 3, because it has detected a loss of voltage, the tie point fault interrupter 304 initiates its pulse testing sequence. This is indicated at Step 3 of FIG. 4 by the heavy outline of the tie point fault interrupter 304 and the dashed horizontal line within. As discussed earlier, a number of preliminary pulses is defined for the tie point fault interrupter 304. Because the number of sectionalizing reclosers in series in the feeder 300 is three, the number of preliminary pulses is defined as two for the tie point fault interrupter 304. As in FIG. 3, the tie point fault interrupter 304 is therefore configured to deliver two preliminary test pulses, and if the two pulses are both measured as fault current pulses, then the fault is determined to be persistent.

The fault count (FC) thresholds shown on FIG. 3 are the same on FIG. 4. Because the number of preliminary test pulses is two, the sectionalizing recloser 310 is defined as having a fault count threshold FC=3. The sectionalizing recloser 312 therefore has a threshold FC=4, and the sectionalizing recloser 314 therefore has a threshold FC=5, as shown at Step 3.

Once again, at Step 3, on the first test pulse by the tie point fault interrupter 304, a fault current is detected by the tie point fault interrupter 304 (and also by the sectionalizing reclosers 312 and 314), indicating that the fault 420 is still present. Then, at Step 4, the pulse testing of the tie point fault interrupter 304 continues. On the second and third test pulses, a fault current is detected by the tie point fault interrupter 304 (and also by the sectionalizing reclosers 312 and 314), indicating that the fault 420 is still present. As discussed earlier, the sectionalizing reclosers may directly detect fault current pulses using their current sensors, or may determine a fault current pulse by detecting a current pulse followed by an absence of normal system voltage. Because the number of test pulses (3) has exceeded the number of preliminary pulses (2), the fault is considered to be persistent.

Still at Step 4, the sectionalizing recloser 310 has a fault count threshold FC=3, but the sectionalizing recloser 310 has not observed any fault currents because it is not located between the fault and the tie point fault interrupter 304, and the sectionalizing recloser 310 is already open anyway. The tie point fault interrupter 304 continues its pulse testing in order to fully isolate the fault. Still at Step 4, on the fourth test pulse, the sectionalizing recloser 312 will experience its fourth fault current pulse, thus reaching its threshold FC=4. The sectionalizing recloser 312 therefore opens to isolate the fault. The tie point fault interrupter 304 continues its pulse testing because it still detected a fault current pulse on the previous (fourth) pulse. Still at Step 4, the sectionalizing recloser 314 will not have experienced its fifth fault current pulse, and the sectionalizing recloser 314 therefore remains closed.

The tie point fault interrupter 304 ends its pulse testing after the fifth test pulse because it now knows (from the detection of a load current pulse vs. a fault current pulse) that the fault 420 is fully isolated. When the tie point fault interrupter 304 exceeds the number of preliminary pulses and subsequently determines that it is isolated from the fault by an open sectionalizing recloser, as in the current analysis, the tie point fault interrupter 304 then closes. This is shown at Step 5, where the tie point fault interrupter 304 has a solid horizontal line within, and power is restored to the customers to the right of the sectionalizing recloser 312.

Also at Step 5, the sectionalizing recloser 310 remains open, and in fact is now locked out, meaning that it will not attempt to reclose because the fault was persistent. The sectionalizing recloser 310 knows that the fault 420 was persistent because the sectionalizing recloser 310 never saw a healthy voltage pulse and subsequent momentary system voltage from the tie point fault interrupter 304. The sectionalizing recloser 312 also remains open at Step 5. Thus, the customers to the left of the sectionalizing recloser 310 receive power from the source through the breaker 302, and the customers to the right of the sectionalizing recloser 312 receive power from the adjacent feeder through the tie point fault interrupter 304. The fault 420 is fully isolated between the sectionalizing reclosers 310 and 312, and customers in this portion of the feeder 300 are without power.

Using the exact same device configurations and control logic, FIGS. 3 and 4 illustrate how the disclosed methods properly handle both a transient fault (FIG. 3; temporarily isolating the fault, and then returning to normal pre-fault conditions after the fault clears) and a persistent fault (FIG. 4; fully isolating the fault and restoring power to unfaulted customers from both ends of the feeder 300). Another type of fault situation deals with reinitiating and low-level faults. This scenario is discussed below.

Figure 5:
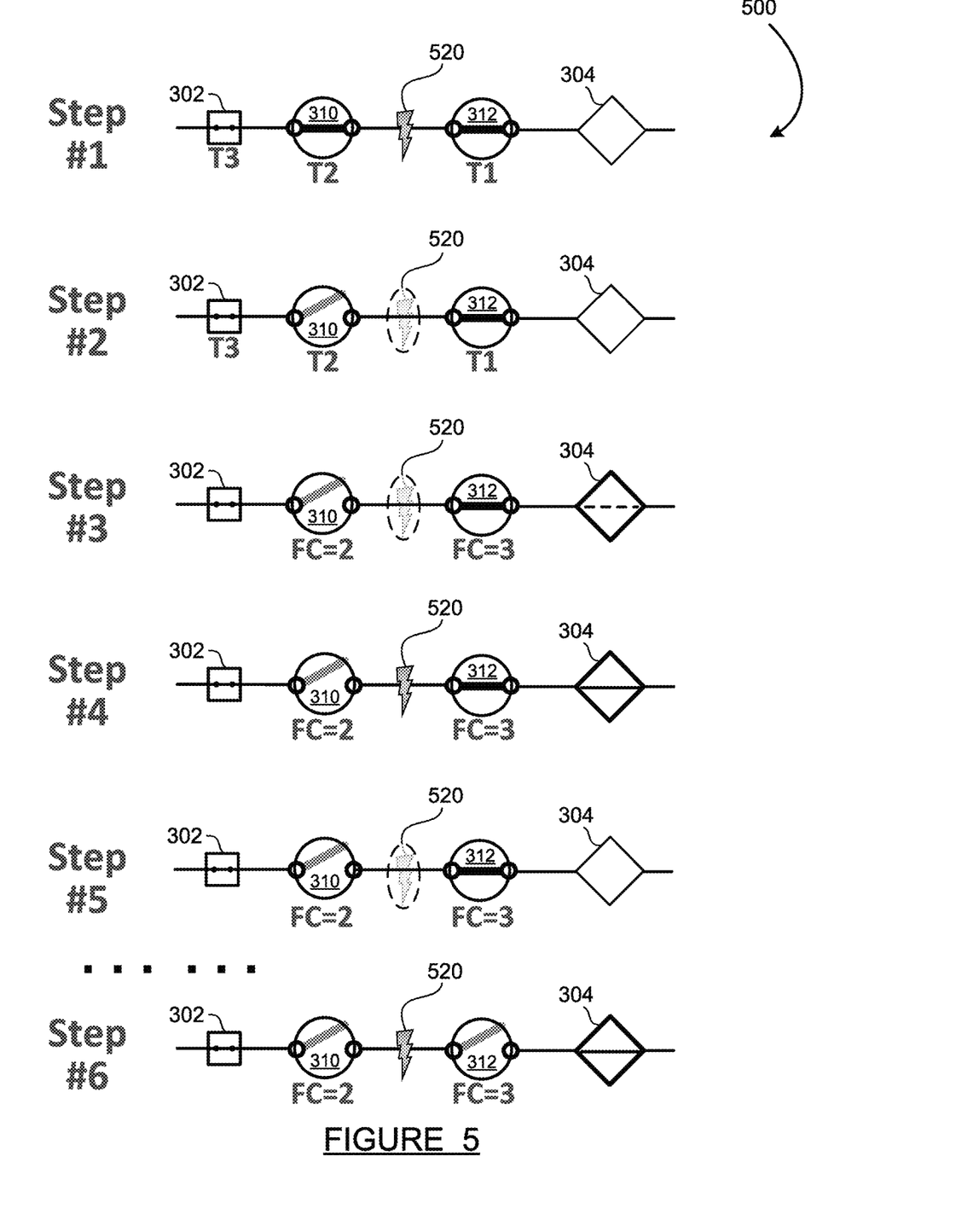
FIG. 5 is a multi-step schematic diagram of a feeder having an intermittent or reinitiating fault and illustrating improved fault recovery behavior compared to prior art systems by using pulse testing techniques, according to another embodiment of the present disclosure.

FIG. 5 is a multi-step schematic diagram of a feeder 500 having an intermittent or reinitiating fault and illustrating improved fault recovery behavior compared to prior art systems by using pulse testing techniques, according to another embodiment of the present disclosure. The feeder 500 in FIG. 5 is similar to the feeder 300 of FIGS. 3 and 4, having the same circuit breaker 302, sectionalizing reclosers 310 and 312 and tie point fault interrupter 304, where the hardware of these devices is the same as previously discussed. The configurations and control logic of the sectionalizing reclosers 310 and 312 and tie point fault interrupter 304 are slightly different in FIG. 5, as will be discussed below. The sectionalizing recloser 314 has been eliminated from the feeder 500, as this device is not relevant to the discussion of this scenario. Other than that, only the persistence of the fault has changed in FIG. 5, thus illustrating a scenario different from FIG. 3 or 4. The single phase fault interrupters 316 are again omitted from FIG. 5 for simplicity.

The scenario of FIG. 5 is that of a reinitiating or low-level fault. Reinitiating faults are faults which increase and decrease in intensity in a cyclical manner; for example, a few seconds after a tree limb creates a short circuit, the short circuit current heats up the wood in the limb to create a highly conductive path, and then, when power to the fault is cut off, the wood cools and becomes highly resistive, such that a subsequent restoration of power does not initially result in a high fault current, but the conductivity increases and the high fault current returns within a few seconds. Reinitiating faults are also common in some localities based on types of vegetation that grow near power lines, including vines that climb up power line poles. Because reinitiating faults are common in some localities, device configurations have been developed to optimally isolate this type of fault, as illustrated by the devices in the feeder 500 of FIG. 5.

At Step 1 of FIG. 5, a fault 520 occurs between the sectionalizing reclosers 310 and 312. In the case of a reinitializing fault as described above, the fault 520 may take a few seconds to reach a high current level. When the fault 520 occurs, a fault current passes through the breaker 302 and the sectionalizing recloser 310. The sectionalizing recloser 312 does not see a fault current, because it is not located between the source and the fault 520. Of the devices experiencing a fault current, the sectionalizing recloser 310 has the shorter fault current response time (T2). Thus, after its response time elapses, the sectionalizing recloser 310 opens, as shown at Step 2.

With the sectionalizing recloser 310 open as shown in Step 2, the fault 520 is isolated from the breaker 302, the breaker 302 can remain closed, and the customers on the left side of the sectionalizing recloser 310 have power. Also, because the sectionalizing recloser 310 is open, everything to the right of the sectionalizing recloser 310 sees a complete loss of voltage, typically on all three phases. Once again, the reclosing attempts of the sectionalizing recloser 310, as would be done in prior art systems, are avoided in the methodology of the present disclosure.

The other thing that has happened at Step 2 is that, because power has been cut off to the fault 520, the faulting material (tree limb or vine) has cooled off and become highly resistive. Experience and testing have shown that when a tree limb or vine creates a line-to-line or line-to-ground fault, the following behavior is fairly common; because wood is a good insulator, the initial fault current is fairly low; after a period of a few seconds (for example, 1-3 seconds), the wood which is carrying the fault current gets hot and carbonizes as a result, and the carbonized wood is a much better conductor; this causes the fault current to increase dramatically, to thousands of amps; the high fault current causes a device to trip open and cut power to the fault; the wood cools when current is removed, and thus the wood returns to a highly resistive material; this cycle often repeats several times. As mentioned above, the fault 520, which was detected at Step 1 when it was carrying a high fault current, has dropped off to a low level at Step 2. This is indicated by the faded appearance of and the dashed ellipse around the fault 520.

When the fault 520 has faded to a low level as at Step 2, the fault current which it is capable of carrying (which might be in the neighborhood of 200 amps, compared with a full fault current of thousands of amps) may be indistinguishable from load currents in the feeder 500. This creates a challenge for the response of the sectionalizing reclosers and the tie point fault interrupter. Device configurations which address this challenge are discussed in connection with the remaining steps of FIG. 5.

At Step 3 of FIG. 5, because it has detected a loss of voltage, the tie point fault interrupter 304 initiates its pulse testing sequence, as indicated by the heavy outline of the tie point fault interrupter 304 and the dashed horizontal line within. When the tie point fault interrupter 304 initiates its first test pulse, it does not detect the fault 520, because the fault 520 is now a low-level fault (highly resistive material). The test pulses provided by the tie point fault interrupter 304 are not sufficient to reheat the fault-causing material and return it to a highly conductive state. Thus, at Step 3, the fault 520 is not detected.

Rather than continuing to pulse test as in the feeder 300 of FIGS. 3 and 4, a different approach is used in the feeder 500 of FIG. 5 where reinitiating faults are expected. In this case, after loss of power is detected at the tie point fault interrupter 304 (at Step 2) and the fault is not detected in pulse testing (at Step 3), the tie point fault interrupter closes at Step 4. Closing the tie point fault interrupter 304 at Step 4 causes the fault 520 to redevelop as the wood reheats, as indicated by the vivid fault appearance at Step 4. This approach is still preferable over the prior art technique of reclosing the sectionalizing recloser 310, because reclosing the sectionalizing recloser 310 creates higher system stresses and greater voltage sag due to the proximity of the source to the fault. When the tie point fault interrupter 304 closes at Step 4, the sectionalizing recloser 312 experiences a full overcurrent fault, not a fault pulse current. Also at Step 4, reclosing of the sectionalizing recloser 310 is blocked by the temporary detection (for example, 1-3 seconds) of load-side voltage (voltage from the tie point fault interrupter 304); thus, the sectionalizing recloser 310 remains open.

A few seconds after the tie point fault interrupter 304 closes at Step 4, the fault has returned to a high level and the fault current is high enough to cause the tie point fault interrupter 304 to open, and this happens at Step 5. In the feeder 500, the tie point fault interrupter 304 is configured to trip open with maximum fault sensitivity and fastest tripping when a fault current is again experienced. At Step 5, with the tie point fault interrupter 304 open, the fault again fades to a low-level fault as the wood cools due to lack of fault current.

The closing and opening of the tie point fault interrupter 304, shown in Steps 4 and 5, repeats until the sectionalizing recloser 312 reaches a number of overcurrent fault counts exceeding its threshold, which may be the same as its fault pulse count threshold (3). When the sectionalizing recloser 312 reaches its overcurrent fault count threshold, it opens as shown at Step 6. The opening of the sectionalizing recloser 312 fully isolates the fault 520. The next time the tie point fault interrupter 304 closes, there is no fault current, and the tie point fault interrupter 304 therefore remains closed.

Step 6 illustrates the desired final configuration of the feeder 500 in the event of the reinitiating fault 520; the fault is fully isolated between the open sectionalizing reclosers 310 and 312, the breaker 302 is closed and power is provided to customers to the left of the sectionalizing recloser 310, and the tie point fault interrupter 304 is closed and power is provided to customers to the right of the sectionalizing recloser 312.

To summarize the preceding discussion of FIGS. 3-5: sectionalizing reclosers are configured with fault current response times (longest for device nearest source breaker) and also configured with pulse-catching fault count (FC) thresholds (highest for device nearest pulse-testing tie point fault interrupter); tie point fault interrupters are configured to initiate pulse testing upon detecting loss of voltage; a number of preliminary pulses are used to determine whether a fault is transient or persistent; tie point fault interrupters only close if fault persists beyond preliminary pulses and then becomes isolated from tie point fault interrupter by an open sectionalizing recloser. An alternate configuration may be used where reinitializing faults are anticipated, where the alternate configuration includes the tie point fault interrupter closing if initial pulse testing indicates no fault, and subsequent cycles cause a sectionalizing recloser adjacent the fault to open, enabling the tie point fault interrupter to close and hold.

FIGS. 3-5 illustrate simple feeders with no branching. However, it will be understood by those skilled in the art that the techniques of the present disclosure are also applicable to branched feeders with a tie point fault interrupter at the end of each branch. In such cases, each tie point fault interrupter which experiences a loss of voltage due to the fault current opening of a sectionalizing recloser will initiate pulse testing as discussed above.

Figure 6:
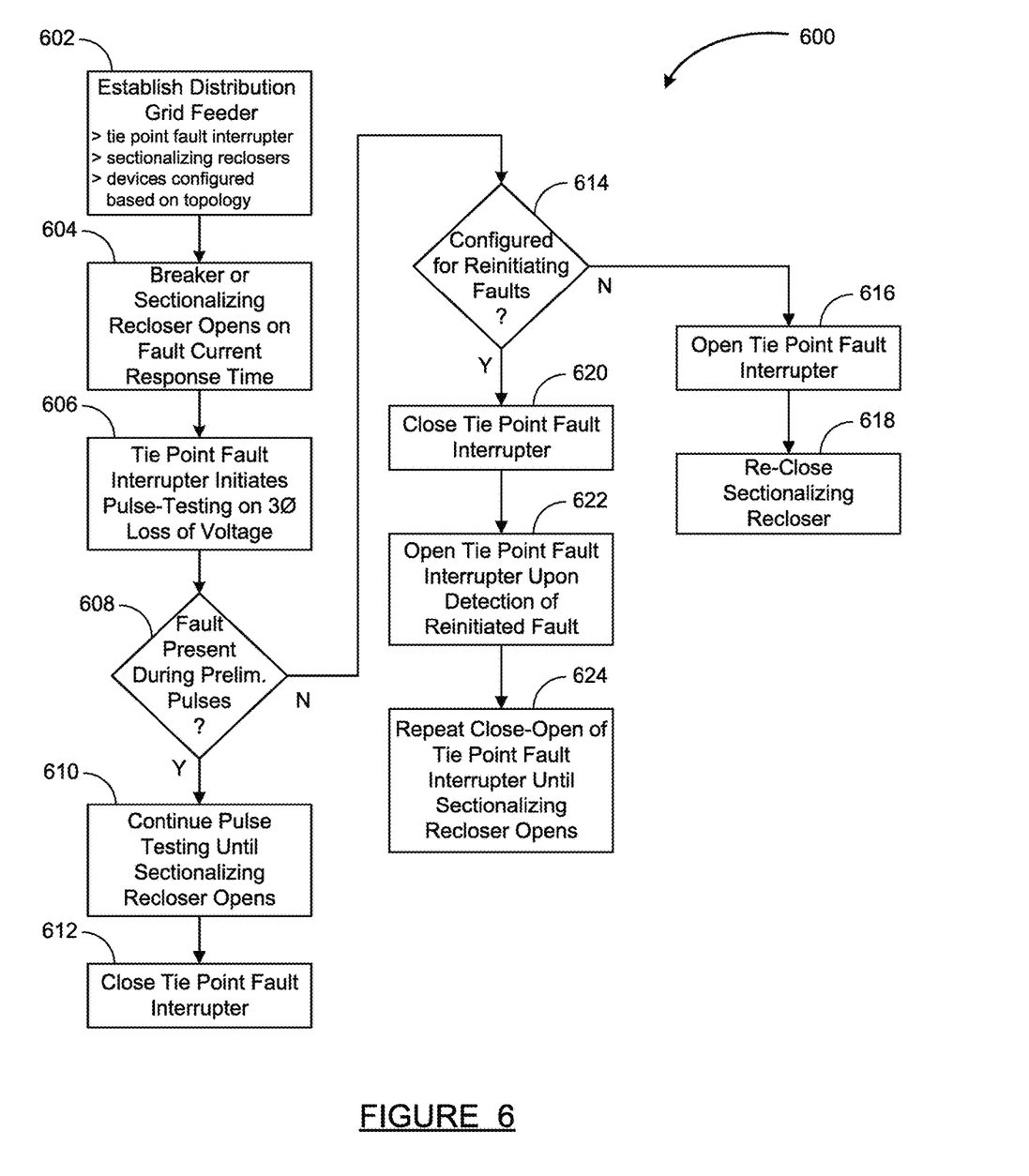
FIG. 6 is a flowchart diagram of a method for isolating a fault in a feeder including sectionalizing reclosers and a tie point fault interrupter capable of pulse testing, according to embodiments of the present disclosure.

FIG. 6 is a flowchart diagram 600 of a method for isolating a fault in a feeder including sectionalizing reclosers and a tie point fault interrupter capable of pulse testing, according to embodiments of the present disclosure. The method of FIG. 6 incorporates the features described above, including pulse testing by a normally open tie point fault interrupter to determine the persistence of a fault, restoring the feeder to its pre-fault condition in the case of a transient fault, and isolating the fault otherwise.

At box 602, a distribution grid feeder such as the feeder 300 is established, including a primary source with an adjacent breaker, a normally open tie point fault interrupter at the opposite end of the feeder from the source, and a plurality of sectionalizing reclosers (sectionalizing switches with pulse-detecting capability and reclosing capability) spaced apart within the interior of the feeder between the source and the tie point fault interrupter. The sectionalizing reclosers include voltage and current sensors for each phase/pole on each side of the switch and a controller for controlling the switch, and the tie point fault interrupter includes the controller, sensors and switches discussed previously. Establishing the feeder at the box 602 includes providing feeder topology information to the tie point fault interrupter and each of the sectionalizing reclosers, along with the values of fault current response time and fault pulse count and fault current count for the sectionalizing reclosers which are based on the position of each sectionalizing recloser relative to the active source and the tie point fault interrupter. Furthermore, the controller in each of the sectionalizing reclosers includes the programming logic for opening and reclosing based on test pulse count and other conditions.

At box 604, when a fault occurs on at least one phase somewhere within the feeder, a fault current is experienced by the breaker and possibly by one or more of the sectionalizing reclosers. The breaker and the sectionalizing reclosers are configured with fault current response times where the device nearest (and upstream of) the fault will trip open at the box 604 based on its response time being the shortest of the devices experiencing the fault current. At box 606, when the tie point fault interrupter detects a loss of voltage (normally on all three phases), the tie point fault interrupter knows that the breaker or a sectionalizing recloser has opened in response to a fault. The tie point fault interrupter then initiates its pulse-testing sequence at the box 606.

At decision diamond 608, the tie point fault interrupter determines whether the fault is still present during preliminary pulses, where the number of preliminary pulses is one less than the number of sectionalizing recloser devices in series between the tie point fault interrupter and the breaker. If the fault is still present after the preliminary pulses, then the fault is persistent, which is the scenario illustrated in FIG. 4. In this case, the tie point fault interrupter continues pulse testing at box 610 until one of the sectionalizing reclosers opens to isolate the fault. The sectionalizing recloser which opens will be the one that is nearest the fault on the side of the tie point fault interrupter, where the opening is based on pre-configured values for fault pulse count threshold. At box 612, with the fault fully isolated, the tie point fault interrupter closes to restore power to customers between the just-opened sectionalizing recloser and the tie point fault interrupter. This is the final configuration for the case of a persistent fault, shown at Step 5 of FIG. 4.

From the decision diamond 608, if the fault is not still present after the preliminary pulses, then at decision diamond 614 it is determined whether the feeder devices are configured for reinitiating faults. If the feeder devices are not configured for reinitiating faults, then at box 616 the tie point fault interrupter opens when it detects that the fault is no longer present by the end of the preliminary pulses. This is the case of a transient fault, shown in FIG. 3. Then at box 618, the sectionalizing recloser which opened at box 604 recloses in order to restore the feeder to its original pre-fault configuration and restore power to all customers. This is the final configuration for the case of a transient fault, and is shown at Step 5 of FIG. 3.

From the decision diamond 614, if the feeder devices are configured for reinitiating faults, then at box 620 the tie point fault interrupter closes when it detects that the fault is no longer present by the end of the preliminary pulses. This is the case of a reinitiating fault, shown in FIG. 5. The sectionalizing recloser which opened at the box 604 is prevented from reclosing by the temporary presence of load-side voltage from the closed tie point fault interrupter. At box 622, after a period of time (a few seconds) sufficient for the fault material (tree branch or otherwise) to re-carbonize and carry a high fault current, the tie point fault interrupter detects the fault current and opens. At box 624, the tie point fault interrupter repeats the steps of the boxes 620 and 622—closing and detecting no fault, followed a few seconds later by opening upon detection of the reinitiated fault—until one of the sectionalizing reclosers opens to isolate the fault on the side of the tie point fault interrupter. The sectionalizing recloser which opens is the one which first reaches its fault current event threshold, which will be the sectionalizing recloser adjacent the fault on the side of the tie point fault interrupter. This is the final configuration for the case of a reinitiating fault, and is shown at Step 6 of FIG. 5.

As will be well understood by those skilled in the art, the several and various steps and processes discussed herein to describe the disclosed methods may be referring to operations performed by a computer, a processor or other electronic calculating device that manipulate and/or transform data using electrical phenomenon. In particular, this refers to the control calculations and operations performed by controllers or processors included in each of the sectionalizing reclosers in the feeders of FIGS. 3-5, and also the controller or processor included in the tie point fault interrupter 304 of FIGS. 3-5. Those processors and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The disclosed methods for isolating faults by automated sectionalizing reclosers equipped with pulse detecting capability when a tie point fault interrupter device is testing for continued fault presence—by using the pulses both to determine fault persistence and to trigger a sectionalizing recloser to open, thereby avoiding multiple source reclosings and time lags associated with loss of voltage timers—provide a means for reliably implementing FLISR without communication capability in the feeder devices. Using these methods, FLISR implementations become less expensive and more reliable in service restoration, which provides significant benefit to electrical power distribution companies and to all consumers on the grid.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for isolating faults in an electrical distribution grid feeder, the feeder including a primary source with an adjacent breaker, a plurality of normally closed sectionalizing reclosers and a normally open tie point fault interrupter at an end opposite the primary source, the method comprising: providing, to the breaker, the sectionalizing reclosers and the tie point fault interrupter, a feeder topology and configuration parameters for device behavior including a fault count threshold for each of the sectionalizing reclosers and a number of preliminary pulses; opening the breaker or one of the sectionalizing reclosers to cut off power downstream in the feeder upon detecting a fault in the feeder; initiating pulse testing by the tie point fault interrupter upon detecting a loss of voltage; continuing pulse testing until a recloser opens based on a fault pulse count threshold, then closing the tie point fault interrupter, when the fault is a persistent fault which is present during all of the preliminary pulses; and opening the tie point fault interrupter and re-closing the open breaker or recloser when the fault clears during the preliminary pulses and the tie point fault interrupter is not configured for reinitiating faults.

2. The method according to claim 1 further comprising, when the tie point fault interrupter is configured for reinitiating faults: closing the tie point fault interrupter and blocking re-closing of the open breaker or recloser when the fault is undetected during the preliminary pulses; opening the tie point fault interrupter upon detecting that the fault has reinitiated; and repeating closing and opening the tie point fault interrupter during reinitiating faults until a recloser opens upon reaching a fault current count threshold or the tie point fault interrupter exhausts a predefined number of closing attempts.

3. The method according to claim 2 wherein opening the tie point fault interrupter upon detecting that the fault has reinitiated includes determining that a measured current through the tie point fault interrupter exceeds a fault current amperage threshold.

4. The method according to claim 1 wherein the configuration parameters for device behavior further include a fault current response time for the breaker and for each of the sectionalizing reclosers, where a recloser furthest from the primary source has a shortest response time, sectionalizing reclosers have a successively longer response time for each position nearer the primary source, and the breaker has the longest response time.

5. The method according to claim 4 wherein opening the breaker or one of the sectionalizing reclosers upon detecting a fault in the feeder includes opening by a device located immediately upstream of the fault based on the fault current response time.

6. The method according to claim 1 wherein the number of preliminary pulses is one less than a number of sectionalizing reclosers in the feeder.

7. The method according to claim 1 wherein the fault count threshold for each of the sectionalizing reclosers is defined such that a recloser furthest from the tie point fault interrupter has a threshold equal to the number of sectionalizing reclosers in the feeder, and reclosers have successively higher thresholds for each position nearer the tie point fault interrupter.

8. The method according to claim 1 wherein initiating pulse testing by the tie point fault interrupter includes developing a current pulse on one or more of three phases of the feeder successively and at a regular interval.

9. The method according to claim 8 wherein each of the current pulses is detectable by the tie point fault interrupter and by the sectionalizing reclosers as either a fault current pulse or a load current pulse, where a current pulse that is not followed by some period of momentary system voltage is detectable by the sectionalizing reclosers as a fault current pulse.

10. The method according to claim 1 wherein continuing pulse testing until a recloser opens includes opening a recloser, located between the fault and the tie point fault interrupter, which reaches its fault count threshold.

11. The method according to claim 1 wherein each of the sectionalizing reclosers includes voltage and current sensors and a controller having a processor and memory, the controller receiving signals from the sensors and being configured to open or reclose contacts in the sectionalizing recloser based on the configuration parameters.

12. The method according to claim 1 wherein the tie point fault interrupter includes voltage and current sensors and a controller having a processor and memory, the controller receiving signals from the sensors and being configured to open and close contacts in the tie point fault interrupter and control the pulse testing based on the configuration parameters.

13. The method according to claim 1 wherein the feeder further includes one or more branches, where each branch includes one or more normally closed sectionalizing reclosers and a normally open tie point fault interrupter at an end distal from the primary source.

14. A fault location, isolation and service restoration system for a distribution grid feeder, the system comprising:
a primary source with an adjacent breaker at a first end of the feeder;
a tie point fault interrupter at a second end of the feeder and including voltage and current sensors and a controller having a processor and memory, the controller receiving signals from the sensors and being configured to open and close contacts in the tie point fault interrupter and control a pulse testing sequence based on predefined configuration parameters; and
a plurality of sectionalizing reclosers spaced apart throughout the feeder, where each of the sectionalizing reclosers includes voltage and current sensors and a controller receiving signals from the sensors and being configured to open switches in the sectionalizing recloser based on readings from the sensors and the configuration parameters,
where the breaker or one of the sectionalizing reclosers immediately upstream of a fault opens based on a fault current response time when the fault occurs in the feeder, and the breaker or sectionalizing recloser which opened does not attempt reclosing to determine if the fault is persistent,
the tie point fault interrupter begins the pulse testing sequence, to determine if the fault is persistent, upon detecting a loss of voltage,
the tie point fault interrupter opens and the open breaker or sectionalizing recloser recloses when the fault clears during a predefined number of preliminary pulses, and
a sectionalizing recloser opens to isolate the fault and then the tie point fault interrupter closes when the fault is present during all of the preliminary pulses.

15. The system according to claim 14 wherein the configuration parameters include a fault current response time for the breaker and for each of the sectionalizing reclosers, where a recloser furthest from the primary source has a shortest response time, sectionalizing reclosers have a successively longer response time for each position nearer the primary source, and the breaker has the longest response time.

16. The system according to claim 14 wherein the configuration parameters include the number of preliminary pulses which is one less than a number of sectionalizing reclosers in the feeder.

17. The system according to claim 14 wherein the configuration parameters include a fault count threshold for each of the sectionalizing reclosers, where a recloser furthest from the tie point fault interrupter has a threshold equal to the number of sectionalizing reclosers in the feeder, and reclosers have successively higher thresholds for each position nearer the tie point fault interrupter.

18. The system according to claim 14 wherein the pulse testing sequence by the tie point fault interrupter includes developing a current pulse on one or more of three phases of the feeder successively and at a regular interval, and each of the current pulses is detectable by the tie point fault interrupter and by the sectionalizing reclosers as either a fault current pulse or a load current pulse, where a current pulse that is not followed by some period of momentary system voltage is detectable by the sectionalizing reclosers as a fault current pulse.

19. The system according to claim 14 wherein the tie point fault interrupter is configured for reinitiating faults and, when the fault is undetected during the preliminary pulses, the tie point fault interrupter closes and re-closing of the open breaker or recloser is blocked.

20. The system according to claim 19 wherein the tie point fault interrupter opens upon detecting that the fault has reinitiated, and closing and opening the tie point fault interrupter is repeated until a recloser opens upon reaching a fault current count threshold.

* * * * *